United States Patent
Kaplan

(10) Patent No.: US 7,089,022 B1
(45) Date of Patent: Aug. 8, 2006

(54) SYSTEMS AND METHODS FOR OBTAINING LOCATION BASED INFORMATION USING A MOBILE COMMUNICATION DEVICE

(75) Inventor: Diego Kaplan, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 0 days.

(21) Appl. No.: 11/049,789

(22) Filed: Feb. 2, 2005

(51) Int. Cl.
*H04Q 7/20* (2006.01)

(52) U.S. Cl. .............................. 455/456.3; 455/456.1; 455/404.2; 455/440

(58) Field of Classification Search ............. 455/456.1, 455/456.3, 404.2, 440, 457, 422.1, 406, 466
See application file for complete search history.

(56) References Cited

U.S. PATENT DOCUMENTS

| | | | |
|---|---|---|---|
| 6,091,810 A * | 7/2000 | Shaffer et al. ......... | 379/221.02 |
| 6,650,902 B1 * | 11/2003 | Richton .................. | 455/456.3 |
| 6,944,447 B1 * | 9/2005 | Portman et al. ......... | 455/422.1 |
| 2002/0103881 A1 * | 8/2002 | Granade et al. ........... | 709/218 |
| 2002/0176579 A1 * | 11/2002 | Deshpande et al. ........ | 380/270 |
| 2004/0152442 A1 * | 8/2004 | Taisto et al. ................ | 455/406 |
| 2004/0192339 A1 * | 9/2004 | Wilson et al. ........... | 455/456.1 |
| 2004/0203919 A1 * | 10/2004 | Ross et al. ............... | 455/456.1 |
| 2005/0221812 A9 * | 10/2005 | Gailey et al. ............ | 455/422.1 |
| 2005/0277432 A1 * | 12/2005 | Viana et al. ................ | 455/466 |

* cited by examiner

*Primary Examiner*—Joseph Feild
*Assistant Examiner*—Huy D. Nguyen

(57) ABSTRACT

A method for obtaining information related to services within a certain area using a mobile communication device includes downloading a menu of services based on a coarse determination of the position of the mobile communication device, where each service in the menu is associated with a telephone number. The associated telephone number is used to connect to a networked based server that stores information related to a plurality of services. Once the menu of services and associated telephone numbers is downloaded, a subscriber can select one of the services in order to obtain information related to the service using the associated number.

14 Claims, 3 Drawing Sheets

SYSTEMS AND METHODS FOR OBTAINING LOCATION BASED INFORMATION USING A MOBILE COMMUNICATION DEVICE

FIELD OF THE INVENTION

The field of the invention relates generally to mobile communication and more particularly to providing location based services to a mobile communication device.

BACKGROUND OF THE INVENTION

When a mobile subscriber is traveling, especially when traveling in an unfamiliar area, it can be useful for the subscriber to be able to obtain information related to local shops, or services such as weather reports, traffic reports, etc. In particular, it would be very useful if the mobile subscriber could obtain such information using their mobile communications device. Mobile communications devices have become quite ubiquitous and therefore, provide a convenient platform by which to obtain such information.

Presently, the capability to push information to a mobile communication device from a networked based system through the wireless communication infrastructure exists. Similarly, the ability to access information and pull it from a networked based system using a mobile communication device also exists. What is lacking in conventional systems is the ability to manage and control what information is received by the mobile communication device. Further, the methods for pushing or pulling information mentioned above typically depend on some type of web based service. Such services, however, can be costly and service can vary from area to area. Use of such services also requires that the mobile communication device include some form of browser application to access the web based service. Use of such programs can tax the already limited resources of the mobile communication device. Further, because of display limitations, viewing the information can be inconvenient and/or inefficient.

Location determination on mobile electronic devices can be accomplished through the use of Global Positioning System (GPS) satellites. Some mobile communication device implementations include Assisted GPS (A-GPS.) In an A-GPS systems many of the calculations necessary to determine position are performed remotely, as apposed to on the mobile communication device. Alternatively, many mobile wireless communication devices can perform all calculations typically performed on a standalone GPS receiver.

SUMMARY

A method for obtaining information related to services within a certain area using a mobile communication device includes downloading a menu of services based on a coarse determination of the position of the mobile communication device, where each service in the menu is associated with a telephone number. The associated telephone number is used to connect to a networked based server that stores information related to a plurality of services. Once the menu of services and associated telephone numbers is downloaded, a subscriber can select one of the services in order to obtain information related to the service using the associated number.

In one aspect, once the selection of a service is made, the mobile device will call the associated number and a more accurate location of the mobile device will be obtained. The mobile device will then connect with the associated networked based server and provide the more accurate location information. Based on the more accurate location information, the server will access information related to the type of service selected and provide it to the mobile communication device for output to the user.

In another aspect, the location information can be provide to a server using dual Dual-Tone Multi Frequency signals. In another aspect, the server can be configured to convert the service information into voice signals that the subscriber can listen to using the mobile communication device.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION

Figure 1:
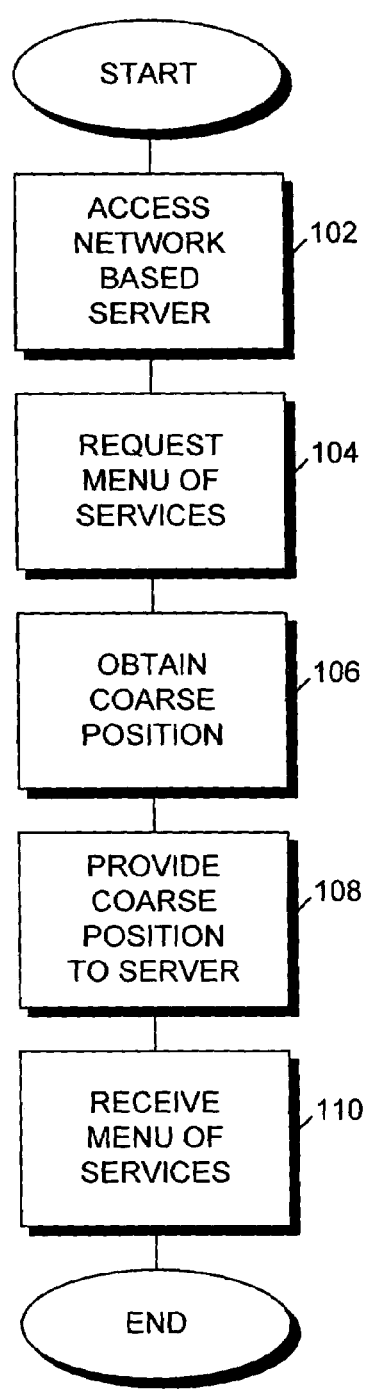
FIG. 1 is a flowchart illustrating an example for obtaining a menu of services in accordance with one embodiment.

FIG. 1 is a flowchart illustrating an example for obtaining a menu of services in accordance with one embodiment of the systems and methods described herein. In step 102, a mobile communication device can access a network based server. The mobile communication device can be, for example, a mobile telephone handset, personal digital assistant, etc. Depending on the embodiment, the server can be accessed by the mobile communication device by a variety of communication methods, including data calls and voice calls. The server can be co-located with a network base station. In this way the server can transmit and receive signals from the mobile communication device through a base station radio or radios. Alternatively, the server can be remotely located and communicate with the network base station over a communication link.

In step 104 the mobile communication device can request a menu of services. The menu of services can be a list generated based on a general or coarse location of the mobile communication device. Alternatively, the menu can be generic, i.e. the same list can be used regardless of location. The request can occur responsive to a mobile communication device user's request for services. Alternatively, the request can be generated by the mobile communication device, e.g. the device can be configured to update the menu of services every month, or when the device location changes by, for example, more than 50 miles.

In step 106 the mobile communication device can optionally obtain a coarse position. Coarse position can be determined by a variety of methods. For example, coarse position can be determined based on which base station or base stations the mobile communication device is communicating with. When a mobile communication device is communicating with a base station or base stations it can in many cases be near the base station, depending on the range of the mobile communication device. For example, in embodiments that include a mobile communication device with limited range the coarse position can be based on the location of the base station. Coarse position can also be determined by a position determination system such as a Global Positioning System (GPS) receiver. GPS receivers receive signals from a series of satellites and calculate position based on the received signals. GPS will be discussed further below.

In step 108 coarse position is provided to the server. The server can, in one embodiment, tailor the menu of services based on the coarse location. For example, in an embodiment, if the mobile communication device is near a ski resort then ski resorts can be included under travel services.

In step 110 the mobile communication device can receive the menu of services from the server. The menu of services can be received over the voice or data call used to access the network based server in step 102. The menu can then be available so that the user of the mobile communication device can access information regarding locally available services. Selecting services from a menu will be discussed below with respect to FIG. 2.

Figure 2:
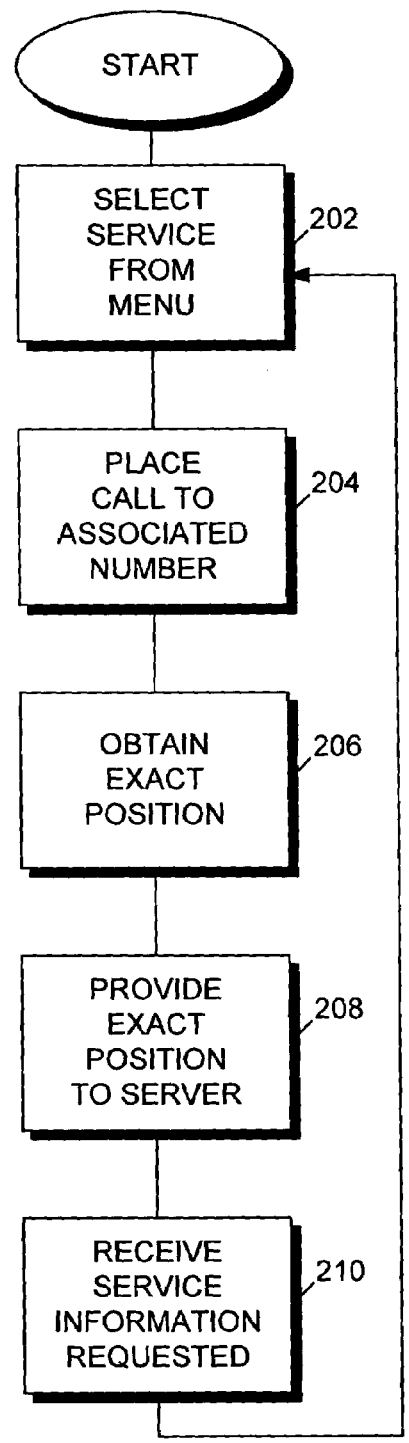
FIG. 2 is a flowchart illustrating an example of a method for obtaining location based information in accordance with one embodiment.

FIG. 2 is a flowchart illustrating an example of a method for obtaining location based information in accordance with the systems and methods described herein. In step 202 a service can be selected from a menu. For example, the menu can be obtained from a network based server, as described in FIG. 1. In another embodiment, the menu can be preprogrammed into the mobile communication device.

The menu can be displayed using a graphical user interface on a mobile communication device. For example, the menu can be a list of services, e.g. a list or lists of restaurants, recreation areas, community services, entertainment, shopping, travel services, banks, Automatic Teller Machines (ATMs), etc. The list of services can be a textual list. Alternatively, the menu can be graphical, for example, shopping can be represented by an icon representing packages, travel services can be represented by an icon representing an airplane, banks and ATMs by a dollar sign icon, etc.

The menu of services can be multiple layers deep and can include both textual and graphical elements. For example, when a user selects a graphical element, such as an airplane the graphical user interface can then display a sub-menu of travel related services, such as air travel, rental cars, and hotel accommodations. In an embodiment, the user of a mobile communication device can select between graphical and textual menus.

In step 204 a call is placed to a telephone number associated with the service selected in step 202. The call can, for example, be a voice call. When the mobile communication device places a telephone call to the telephone number associated with the service the mobile communication device can be connected to a server or servers. The server or servers can be connected to a database that includes information about the service requested.

In step 206 a more accurate, or fine, position of the mobile communication device can be obtained. The fine position only has to be as accurate as necessary for the systems and methods described herein. For example, to provide the user of a mobile communication device with information about the location of an ATM, or other service, accuracy of perhaps forty five feet may be adequate; however, greater accuracy can be preferable or can be required, depending on the embodiment. Additionally, however, accuracy that is much worse than forty five feet can in many cases still be useful in directing the user to an ATM, or other service. The accuracy of the exact location determination can vary from implementation to implementation, in some cases accuracy within 100 feet or more may be acceptable. Depending on the methods used to determine the fine location, the accuracy of the fine location determination may vary over time.

The fine position can be determined by using a GPS receiver. Today's GPS receivers can be extremely accurate; however, certain atmospheric factors and other sources of error can affect the accuracy of GPS receivers. GPS receivers can be accurate to within 45 feet on average. GPS receivers that include Wide Area Augmentation System (WAAS) capability can improve accuracy to less than nine feet on average. Users can also get better accuracy with Differential GPS (DGPS), which corrects GPS signals to within an average of nine to fifteen feet. Depending on the accuracy required for the specific implementation, GPS, GPS with WAAS, or DGPS can be three of the many ways to determine exact position.

The GPS receiver can be in the mobile communication device: 1) Standalone, where the device includes all required GPS capability needed to determine position or location; and 2) network assisted, where the network aids the device in determining position.

For network assisted determination, the communication device can include an antenna and associated GPS circuitry for receiving the satellite signals over satellite communication channels. In this implementation, the GPS circuitry decodes the satellite signals. The satellite signals are then sent to a Position Determination Entity (PDE) interfaced with the base station. The PDE determines the position of the mobile communication device from the decoded satellite signals and this information is transmitted back to the mobile communication device.

For non-network assisted, a GPS processor internal to the mobile communication device can be used in place of the PDE. The GPS processor can be configured to process GPS signals received via an antenna which are filtered and amplified in a GPS receiver and demodulated in a GPS demodulator. Thus, the GPS processor can generate position information when requested without the aid of a network based position determination. GPS implementations using an internal GPS processor and GPS implementations using a PDE are well known and will not be described further.

In step 208, position information can be provided to the server. The position information can be provided over the voice call placed in step 204. In one embodiment, Dual Tone Multi-Frequency (DTMF) tones, also known as touch-tones, can be used to transmit the position information. DTMF tones are the audible sounds you hear when you press keys on your phone. The method of generating DTMF tones to transmit position information can be automated. Additionally, other methods can be used to transmit the position information over the voice call.

The term "position" is used in this specification and the claims that follow to refer to the position of the device in terms of latitude and longitude, as is typically provided by a GPS receiver. In certain embodiments, the altitude, speed, and direction are also provided by a GPS receiver. For the purposes of this specification and the claims that follow, "location" is a translation of the position to an area. For example, the present position of a mobile device may reveal that the device is "located" in the city of San Diego. Thus, the position of the mobile device is the latitude and longitude coordinates of the device and the location is San Diego.

Figure 3:
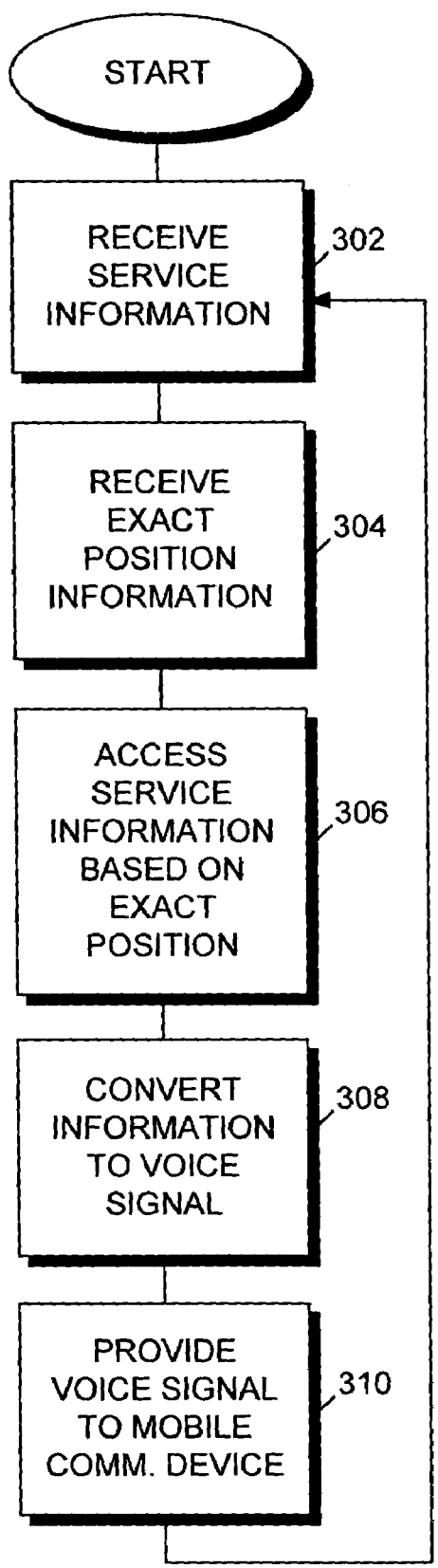
FIG. 3 is a flowchart illustrating an example of a method for obtaining location based services in accordance with one embodiment.

FIG. 3 is a flowchart illustrating an example of a method for obtaining location based information from the point of view of the server in accordance with the systems and methods described herein. In step 302 a server receives service information. As discussed above, the service information requested by the mobile communication device can include, for example, information about restaurants, recreation areas, community services, entertainment, shopping, travel services, banks, ATMs, etc.

In step 304 the server receives more accurate position information. As discussed above, the more accurate position information only has to be as accurate as necessary for the systems and methods described herein and can be obtained by using a GPS receiver, or other position location determination device.

In step 306 the server can access service information based on the more accurate position information. The information can be stored in a database connected to the server. In an embodiment, the server can provide, for example, a list of near by ATMs. The ATMs can be listed in order from the nearest to the farthest. The list can be limited by a set number of ATMs, or list all ATMs within a certain radius of the current location.

In step 308 the service information can be converted to a voice signal. The conversion to a voice signal can occur in a variety of ways. In one embodiment, for example, the information can be stored as a digital representation of a sound file that comprises a voice signal. Many types of sound files can be used, depending on the embodiment. Some examples of sound files that are common on personal computers, and can be used with the systems and methods described herein, include .wav, .mp3, etc. The sound file can then be "played" and the resulting sound can be transmitted to the mobile communication device over a voice channel. In another embodiment, the service information can be stored as text and converted to a voice signal using text-to-speech conversion. Text-to-speech conversion and storage of sound files are well known and will not be discussed further herein.

In step 310 the voice signal can be provided to the mobile communication device. For example, if the voice signal is stored as text, the text can be converted to speech using text-to-speech conversion and the voice signal can be transmitted to the mobile communication device. Alternatively, if the voice signal is stored as a sound file, the sound file can be converted to sound and the sound, which can comprise a voice signal, can be transmitted.

Figure 4:
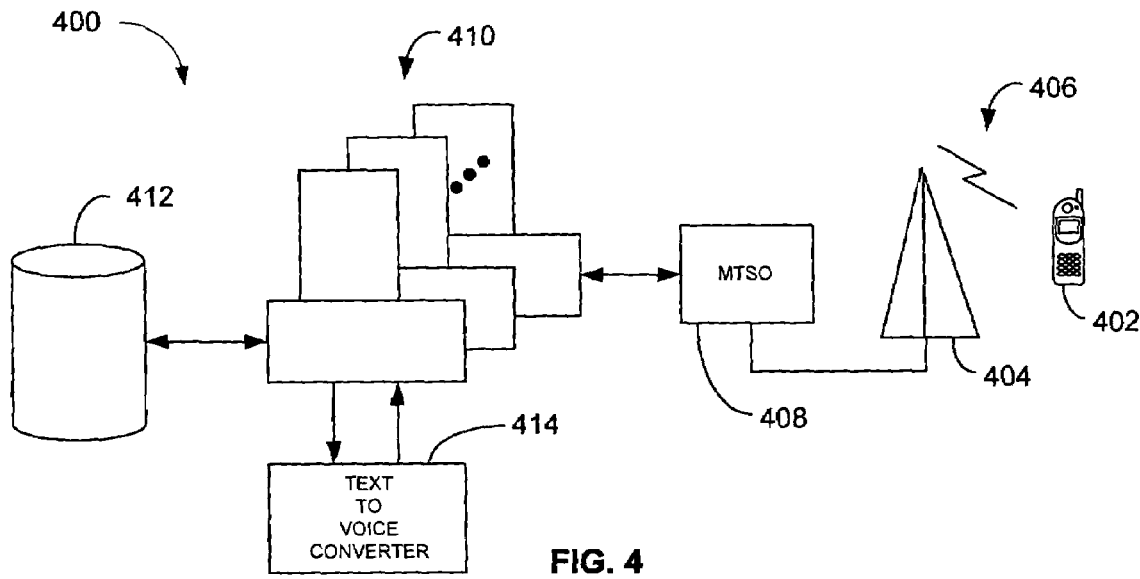
FIG. 4 is a diagram illustrating an example wireless communication system comprising a mobile communication device and a network based server configured in accordance with one embodiment.

FIG. 4 is a diagram illustrating an example wireless communication system 400 comprising a mobile communication device 402 and a network based server 410 configured in accordance with one of the systems and methods described herein. Mobile communication device 402 communicates with a base station 404 using a communication signal 406. Communication signal 406 can be an analog or a digital signal.

Base station 404 is connected to a Mobile Telephone Switching Office (MTSO) 408. MTSO 408 handles mobile communication device 402 connections to the normal land-based phone system, and can control base stations, such as base station 404, in a given region. Server 410 can actually comprise one or more servers, routers, computers, software algorithms, etc., as required to perform the functions described herein.

In one embodiment, server 410, can be connected to MTSO 408. Server 410 can be connected to MTSO 408 over a variety of communication connections. For example, server 410 can be connected to MTSO 408 over a normal land-based telephone system. Alternatively, server 410 can be co-located near the MTSO and connected to the MTSO without the use of the normal land-based telephone system. In one embodiment, server 410 can be co-located, while in another embodiment, server 410 can be at several different locations.

In an embodiment that uses multiple servers connected using the normal land-based telephone system each server can be accessed through a different telephone number. For example, one server can be dedicated to information about the location of banks, while another server can be dedicated to information about hotel accommodations. Thus, telephone number called can be determined based on which service the user of the mobile communication device would like to access (step 204).

Server 410 can also be connected to a database, or databases 412. Database 412 can include data about the services accessible by the system, e.g. information about restaurants, recreation areas, community services, entertainment, shopping, travel services, banks, Automatic Teller Machines (ATMs), etc. Database 412 can actually comprise multiple databases in one location or distributed across servers/locations. For example, a different database can be connected to each server where multiple servers are used. Alternatively, a different database can be maintained for each service, with various databases connected to one or more servers.

A text-to-voice converter 414 can be connected to server 410 or servers. Text-to-voice converter 414 can be used to transmit information requested by a user. For example, the information can be transmitted over a voice call.

Figure 5:
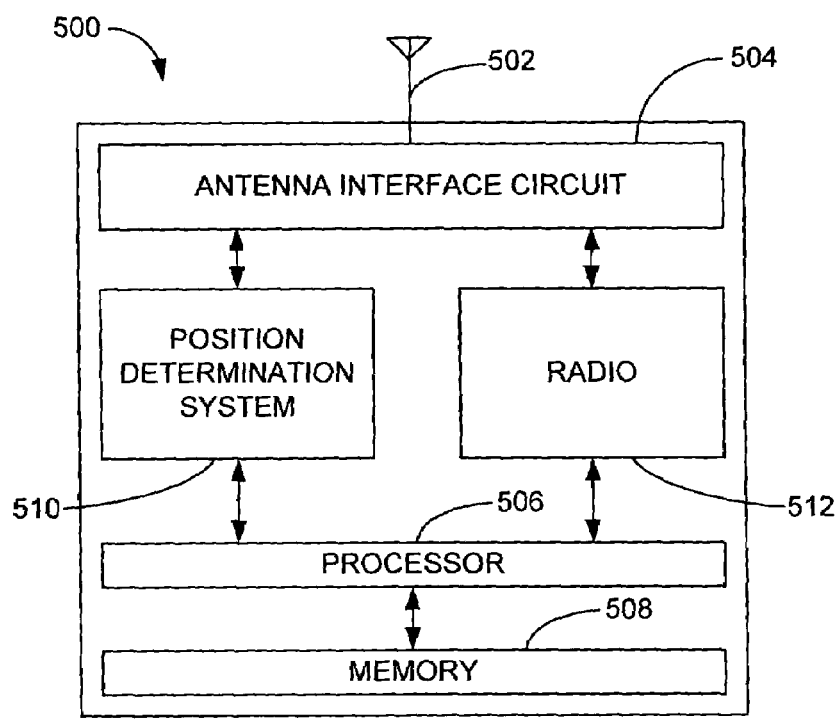
FIG. 5 is a diagram illustrating another example mobile communication device, configured to implement the method of FIG. 1.

FIG. 5 is a diagram illustrating an example of mobile communication device 500 configured in accordance with the systems and methods described herein. Mobile communication device 500 can include an antenna 502 configured to transmit wireless signals, receive wireless signals, or both. Antenna 502 is shown as an external antenna; however, it will be appreciated that antenna 502 can be an external antenna, an internal antenna, or some combination of external and internal antennas. Additionally, antenna 502 can be a plurality of antennas, an array of antennas, etc.

Antenna 502 can be connected to a position determination system 510. The position determination system can comprise a GPS receiver. Generally GPS receivers determine position based on information received from satellites. In another embodiment the position determination system 510 can comprise Differential GPS (DGPS.) A DGPS is a system designed to improve the accuracy of GPS position determination by measuring small changes in variables to provide satellite positioning corrections. The DGPS can, in another embodiment comprise a Wide Area Augmentation System (WAAS) GPS Receiver. WAAS is basically a DGPS implemented by the Federal Aviation Administration. Integration of GPS types of functionality into a mobile device is well known, and therefore will not be explained in detail here. Moreover, it will be understood that GPS based position and/or location services can, for example, be standalone, network assisted, or network based. It will also be understood that the systems and methods described herein can use any system or method that can provide information to determine motion.

Other position determination systems can be used, e.g., triangulation can be used to determine the location and velocity of a mobile communication device relative to a plurality of base stations within a communication system.

For example, triangulation between multiple base stations can be used to estimate position.

Position determination system 510 can be connected to a processor 506. Processor 506 can be configured to receive the signals processed by the position determination system. Additionally, processor 506 can be configured to execute instructions that implement the systems and methods described herein.

Processor 506 can be configured to the control radio 512. For example, processor 506 can be configured to cause radio 512 to transmit the signals necessary to make a voice call. Additionally, processor 506 can cause radio 512 to transmit position information. Processor 506 can comprise a microprocessor, digital logic, or a digital signal processor (DSP). Additionally, processor 506 can comprise a mobile station modem (MSM) or an application specific integrated circuit (ASIC). Processor 506 can also be a combination of devices, for example, a microprocessor, a digital signal processor, and digital logic.

Processor 506 can be connected to memory 508, which can be configured to store instructions that implement the systems and methods described. The instructions, when executed by processor 506 control the operation of mobile telephone handset 500. Additionally, memory 508 can store data for processing by processor 506. Data stored can include position data, a menu of services, telephone numbers associated with the menu of services, etc. Memory 508 can be, for example, Random Access Memory (RAM), Flash memory, a hard drive, or some combination thereof. Further, memory 508, or a portion thereof, can be removable. Memory 508 can be a device packaged separately from the processor 506. In another embodiment memory 508 can be packaged with processor 506 in a single device.

It will further be understood that while antenna 502 is described above as a "single" antenna 502, the antenna can be a single antenna, an array of antenna, etc. The single antenna, array of antenna, etc. can be used to transmit and/or receive signals for both position determination system 104 and radio 112. Antenna 502 is shown as an external antenna, it can be an external antenna, an internal antenna, or a combination of external and internal antennas.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A method for obtaining location based information for a mobile wireless communication device, the method comprising:
   accessing a network based server;
   obtaining coarse position information of the mobile wireless communication device;
   providing the coarse position information to the network based server;
   requesting a menu of services from the network based server;
   receiving the menu of services from the network based server based on the coarse position information;
   receiving a service selection from the menu;
   initiating a communication to an information server associated with the selected service;
   obtaining fine position information of the mobile wireless communication device;
   providing the fine position information to the information server; and
   receiving service information corresponding to the selected service based on the fine position information.

2. The method of claim 1,
   wherein the initiating the communication with the information server comprises initiating a voice call to a number associated with the selected service.

3. The method of claim 2,
   wherein the providing the fine position information comprises transmitting dual tone multi-frequency tones indicative of the fine position information.

4. The method of claim 3,
   wherein the service information comprises at least one of pre-stored digital audio and dynamically generated synthesized text-to-speech.

5. A mobile communication device comprising:
   a position determination system;
   a processor coupled to the position determination system;
   a radio coupled to the processor and configured to transmit and receive signals; and
   a memory, coupled to the processor and configured to store instructions, the instructions configured to cause the processor to perform the following steps:
   access a network based server;
   obtain coarse position information of the mobile wireless communication device;
   provide the coarse position information to the network based server;
   request a menu of services from the network based server;
   receive the menu of services from the network based server based on the coarse position information;
   determine that a service has been selected from the menu;
   initiate a communication with an information server associated with the selected service using the radio;
   obtain fine position information of the mobile wireless communication device using the position determination system;
   provide the fine position information to the information server; and
   receive service information corresponding to the selected service based on the fine position information.

6. The mobile communication device of claim 5
   wherein communication initiated with the information server comprises a voice call to a number associated with the selected service.

7. The mobile communication device of claim 6,
   wherein the fine position information comprises dual tone multi-frequency tones indicative of the fine position information.

8. The mobile communication device of claim 5,
   wherein the service information comprises at least one of pre-stored digital audio and dynamically generated synthesized text-to-speech.

9. A server for a mobile communication network, the server comprising:
   a memory, configured to store instructions;

a processor coupled to the memory, and configured to execute the instructions comprising:
  receiving a coarse position of a mobile wireless communication device;
  providing a menu of services based on the coarse position;
  receiving a service information request corresponding to an item of the menu of services;
  receiving fine position information of the mobile wireless communication device;
  retrieving service information corresponding to the service information request based on the fine position information; and
  transmitting the service information to the wireless mobile communication device.

10. The server of claim 9, wherein the service information comprises information stored in a database connected to the server.

11. The server of claim 9, wherein wherein the server is communicably coupled to the wireless mobile communication device over a voice call connection.

12. The server of claim 11, wherein wherein the fine position information comprises dual tone multi-frequency tones indicative of the fine position information.

13. The server of claim 9, wherein wherein the service information comprises pre-stored digital audio.

14. The server of claim 9, wherein wherein the service information comprises dynamically generated synthesized text-to-speech.

* * * * *